United States Patent
Fujikura et al.

(10) Patent No.: US 9,444,671 B2
(45) Date of Patent: Sep. 13, 2016

(54) ANTENNA DIRECTION ADJUSTMENT METHOD AND OFDM RECEPTION DEVICE

(71) Applicant: HITACHI KOKUSAI ELECTRIC INC., Tokyo (JP)

(72) Inventors: Mikio Fujikura, Kodaira (JP); Tatsuhiro Nakada, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/898,056

(22) PCT Filed: Mar. 28, 2014

(86) PCT No.: PCT/JP2014/059240
§ 371 (c)(1),
(2) Date: Dec. 11, 2015

(87) PCT Pub. No.: WO2014/199701
PCT Pub. Date: Dec. 18, 2014

(65) Prior Publication Data
US 2016/0149741 A1 May 26, 2016

(30) Foreign Application Priority Data

Jun. 13, 2013 (JP) .................................. 2013-124912

(51) Int. Cl.
*H04L 27/26* (2006.01)
*H04L 27/00* (2006.01)
*H04B 1/18* (2006.01)

(52) U.S. Cl.
CPC ............. *H04L 27/2659* (2013.01); *H04B 1/18* (2013.01); *H04L 27/0012* (2013.01); *H04L 27/2675* (2013.01)

(58) Field of Classification Search
CPC ........... H04L 27/2659; H04L 27/2675; H04L 27/0012; H04B 1/18

USPC .................................. 375/260, 267, 316, 343
See application file for complete search history.

(56) References Cited

U.S. PATENT DOCUMENTS 7,636,593 B2 * 12/2009 Kurioka ............... H04B 7/0814
342/374
7,672,382 B2 * 3/2010 Yoshida ............ H04B 17/3911
370/208

(Continued)

FOREIGN PATENT DOCUMENTS

JP 2004134883 A 4/2004
JP 2008017010 A 1/2008

(Continued)

OTHER PUBLICATIONS

International Search Report (in Japanese with English Translation) for PCT/JP2014/059240, mailed May 13, 2014; ISA/JP.

(Continued)

*Primary Examiner* — Freshten N Aghdam
(74) *Attorney, Agent, or Firm* — Harness, Dickey & Pierce, PLC

(57) ABSTRACT

The present invention makes it possible to maintain the continuity of reception detection level and adjust the direction of a reception antenna even under the condition that the reception electric field is low and clock timing synchronization at a C/N ratio of 0 dB or less is lost. QAM modulation including a pilot carrier has higher correlativity in one symbol (1152 samples) correlation, and differential modulation with no pilot has higher correlativity in effective symbol (1024 samples) correction. Detection circuits are provided separately for the QAM modulation and the differential modulation, and in the differential modulation, autocorrelation with a 1024 FFT clock delay signal is performed. The higher of the respective correlation results is selected in the final stage.

4 Claims, 15 Drawing Sheets

(56) References Cited

U.S. PATENT DOCUMENTS

| | | | |
|---|---|---|---|
| 8,995,587 B1* | 3/2015 | Zhang | H04B 7/0417 370/334 |
| 2004/0071221 A1 | 4/2004 | Nakada et al. | |
| 2004/0180698 A1* | 9/2004 | Kamemura | G08G 1/094 455/562.1 |
| 2012/0099682 A1* | 4/2012 | Kuwahara | H04B 7/0825 375/343 |

FOREIGN PATENT DOCUMENTS

| | | | |
|---|---|---|---|
| JP | 2008278364 A | 11/2008 | |
| JP | 2008295096 A | 12/2008 | |

OTHER PUBLICATIONS

Chijo Digital Television Hoso no Denso Hoshiki, ARIB STD-B31, 2.1 edition, Dec. 18, 2012, pp. 1 to 87.

Sasaki, Makoto, Developmental Trends of Terrestrial Digitial Broadcasting: Framing Structure, Channel Coding and Modulation for Digital Terrestrial Television, The Journal of The Institute of Image Information and Television Engineers, Mar. 14, 1998, vol. 52, No. 11, pp. 1562-1566.

* cited by examiner

FIG. 9
PRIOR ART
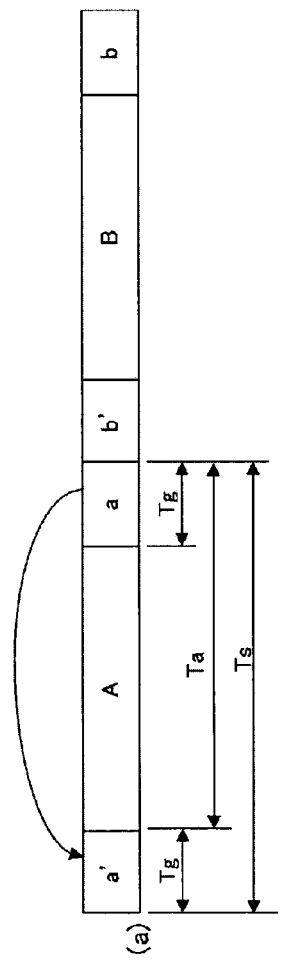
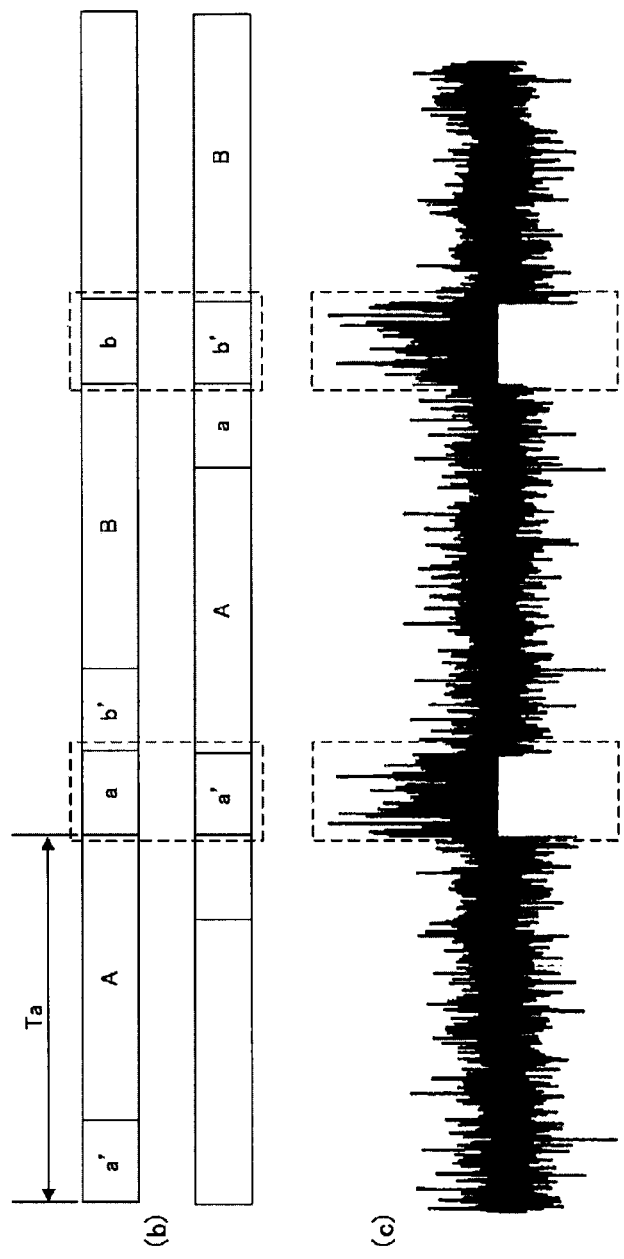

ANTENNA DIRECTION ADJUSTMENT METHOD AND OFDM RECEPTION DEVICE

CROSS REFERENCE TO RELATED APPLICATIONS

This application is a U.S. National Phase Application under 35 U.S.C. 371 of International Application No. PCT/JP2014/059240 filed on Mar. 28, 2014 and published in Japanese as WO 2014/199701 A1 on Dec. 18, 2014. This application is based on and claims the benefit of priority from Japanese Patent Application No. 2013-124912 filed Jun. 13, 2013. The entire disclosures of all of the above applications are incorporated herein by reference.

TECHNICAL FIELD

The present invention relates to reception antenna direction adjustment in a transmission device that uses orthogonal frequency division multiplexing modulation scheme (hereinafter called OFDM scheme).

BACKGROUND ART

In recent years, as a transmission method of a radio image transmission device (hereinafter, a field pickup unit (FPU)) that wirelessly transmits video and voice picked up on site to a television station, OFDM scheme is adopted as a modulation scheme robust over multipath fading, and used for fixed and mobile radio relay (see Non Patent Literature 1).

A conventional antenna direction adjustment method has adopted a method that detects a reception electric field level by a detector at a reception side, searches for a direction in which the reception electric field level is the maximum, and adjusts the direction of an antenna. However, it has been difficult to detect accurately when the reception electric field is low, because a reception signal is buried in noise. More specifically, because in an early stage of antenna direction adjustment, the reception electric field is very low, even if an OFDM signal has arrived albeit only slightly, the reception signal buried in noise cannot be captured, and direction adjustment had to be conducted through a trial-and-error manner.

As a conventional antenna direction adjustment method in the OFDM scheme that has improved the above-mentioned drawbacks, one example is Patent Literature 1. This method will be briefly explained below using FIG. 6.

An OFDM signal that was transmitted from a transmission side and arrived at a reception device is received by a reception antenna 1 and frequency-transformed into a baseband signal by a reception high-frequency unit 2. The baseband signal is input into an A/D conversion circuit 3 and a reception sampling sequence x(t) ("t" is a sample number) is obtained. Then, a demodulated signal D is output to an external device after going through a path of a main line system composed of an FFT (Fast Fourier Transform) circuit 6, a demodulation unit 7, and the like to demodulate a transmitted information code.

In addition, the reception sampling sequence x(t) is input into a synchronization processing unit 8 that synchronizes clock timing and a carrier frequency with a transmission signal, and a synchronization signal SYNC is distributed to the whole OFDM reception unit as a signal to control reception timing.

Furthermore, the reception sampling sequence x(t) is connected with a reception electric field calculation unit 4 that calculates a reception electric field, together with the above-mentioned connection. A reception electric field signal R obtained by the reception electric field calculation unit 4 is connected with a direction adjustment signal generation unit 5, and the direction adjustment signal generation unit generates a direction adjustment signal C of the reception antenna 1.

Next, the configuration of the reception electric field calculation unit 4 will be described further in detail. FIG. 7 is a diagram showing the configuration of the reception electric field calculation unit 4. The reception sampling sequence x(t) from the A/D conversion circuit 3 is connected with an effective symbol delay unit 4-1, and output of a reception sample sequence x(t-τ) delayed by an effective symbol is connected with a complex multiplication unit 4-2. Another input terminal of the complex multiplication unit 4-2 is connected with a reception signal from the A/D conversion circuit 3. As described below, an output signal of the complex multiplication unit 4-2 is connected with an integration unit 4-3, and is output as a reception electric field signal R via an absolute value unit 4-4.

The reception electric field calculation unit 4 performs processing using correlativity of an OFDM guard interval signal. An OFDM signal including the guard interval signal will be explained using FIG. 8 before explaining operation of the reception electric field calculation unit 4.

The OFDM scheme is a method that digitally modulates, at a constant symbol period Ts, hundreds to thousands of carriers arranged at a constant frequency interval, and transmits them. For modulation to an OFDM signal, IFFT (Inverse Fast Fourier Transform) with the number of points τ (for example, τ=1024) is usually used. One symbol of a transmission signal transmitted from the transmission side is composed of a signal (A+a) with an effective symbol period $T_a$ made up of an IFFT-modulated OFDM signal with τ points, and a guard interval signal a' with $M_g$ points in which a signal "a" in an $M_g$ (for example, $M_g$=128) point period $T_g$ at the end of the one symbol is copied to a guard period $T_g$ before the effective symbol period $T_a$. In addition, about b and b' parts of the next symbol, the situation is the same.

Based on the above-described knowledge, processing performed by the reception electric field calculation unit 4 in FIG. 4 will be explained using FIG. 7. A signal in FIG. 9(a) that was sampled by the A/D conversion circuit 3 and input into the reception electric field calculation unit 4 is delayed by the number of sampling times τ (for example, τ=1024) corresponding to the effective symbol period $T_a$ as in FIG. 5(b) by the effective symbol delay unit 4-1. The signal delayed by the effective symbol period $T_a$ and the signal before delay are complex multiplexed per sample point by the complex multiplication unit 4-2, and the following is calculated.

$$C(\tau) = x(t) \times x(t-\tau) \qquad (1)$$

An example of a waveform of an I component among I/Q components of the complex multiplication signal is shown in FIG. 9(c).

Guard interval signals a and a' and b and b' (dashed lines in the figure) in FIG. 9(c) have correlativity and their correlation level is higher than other periods.

The correlation level indicates a small value when the reception electric field level is low, and conversely, when the correlation level is high, which means that the reception electric field level is high.

For each of the thus-obtained I component and Q component of the output signal C(t) from the complex multiplication unit 4-2, the integration unit 4-3 performs averaging processing to suppress a harassing component, and extracts an effective correlation component. In other words, when the amount of contained noise becomes large, it becomes difficult to obtain a correlation waveform from which correlation level difference between the guard interval period and the period other than that can be determined, but by performing integration (averaging processing), an integration result other than the guard interval period converges to zero because there is no correlation in the period other than the guard interval period. On the other hand, the guard interval period has correlativity, and by performing integration processing, a correlation level depending on a CN ratio can be obtained. In addition, the configuration of the integration unit 4-3 can be realized by moving averaging processing performed by an FIR filter or the like, that is, a low pass filter (hereinafter, LPF), or an LPF made up of an IIR filter. Regarding the time constant of the LPF, it is preferable that the time constant is within hundreds msec as a time constant capable of quickly following antenna direction adjustment control.

The output of the complex multiplication unit 4-2 is input into the absolute value unit 4-4, and absolute values of the I component and the Q component are calculated.

As a calculation method for the absolute values, calculating sum of squares of the I component and the Q component enables calculation of the reception electric field signal R proportional to reception power as shown in a formula (2).

$$I^2+Q^2 \quad (2)$$

Because reception devices usually adopt a method that controls the level of a reception signal largely variable depending on a reception condition to an approximately constant level by an automatic gain control (AGC) circuit, and then performs a variety of signal processing, the power of the signal x(t) input into the reception electric field calculation unit 4 is always maintained virtually constant. In the case of such control being performed, the reception electric field signal R from the reception electric field calculation unit 4 cannot be a value proportional to the reception electric field.

FIG. 10 is a diagram showing a characteristic of the reception electric field signal R relative to the CN ratio. Especially, when the CN ratio becomes high, i.e., the reception electric field level becomes high, the level of the reception electric field signal R saturates at a certain constant value. If the level of the reception electric field signal R is in a saturation region, however, it may be determined that antenna direction adjustment is completed because synchronization is also established and the reception electric field higher than a prescribed level is obtained.

Thus, in the early stage of reception antenna direction adjustment, even if the CN ratio of a received OFDM signal is about 0 dB or below, i.e., even if the reception electric field is about −97 dBm or below, presence of the OFDM signal can be adequately detected, and the direction in which the level of the received OFDM signal is the maximum can be searched for while the direction of the reception antenna is being changed.

It has been difficult for the conventional antenna direction adjustment method that detects the reception electric field level by the detector at the reception side and searches for the direction in which the reception electric field level is the maximum, to perform accurate detection because the reception signal is buried in noise when the reception electric field is low. Further, as a modulation scheme of sub-carriers in the same OFDM, there is a scheme including a pilot carrier like a QAM (Quadrature Amplitude Modulation) scheme and a scheme only including a data carrier like a differential scheme. In an antenna direction adjustment method when receiving an OFDM signal for which any of those schemes was used, it has been difficult to discriminate whether the used scheme is the QAM scheme or the differential scheme, and to apply an optimal direction adjustment signal level.

CITATION LIST

Non Patent Literature

Non Patent Literature 1: The Journal of The Institute of Image Information and Television Engineers, 1998, Vol. 52, No. 11

Patent Literature

Patent Literature 1: JP-A-2008-295096

DISCLOSURE OF THE INVENTION

Technical Problem

An object of the present invention is to provide a reception device capable of maintaining the continuity of a detection level and performing stable antenna direction adjustment under the condition that a reception electric field is low and clock timing synchronization is out of step.

Solution to Problem

In order to solve the above-described problems, the present invention has made a reception device comprise: first calculation means that performs complex multiplication of a received OFDM signal by a signal obtained by delaying the OFDM signal by effective symbol period length, performs averaging processing for a signal obtained as a result of the complex multiplication, performs absolute value calculation processing for a complex multiplication signal obtained by the averaging processing, and thereby calculates a signal level; second calculation means that performs complex multiplication of the received OFDM signal by a signal obtained by delaying the OFDM signal by one symbol period length (an effective symbol+a guard interval), performs averaging processing for a signal obtained as a result of the complex multiplication, performs absolute value calculation processing for a complex multiplication signal obtained by the averaging processing, and thereby calculates a signal level; comparison means that compares the signal level obtained by the first calculation means with the signal level obtained by the second calculation means, determines that a scheme is a scheme including a pilot carrier and a data carrier if the signal level obtained by the second calculation means is higher than the signal level obtained by the first calculation means, and determines that the scheme is a scheme only including a data carrier if the signal level obtained by the second calculation means is lower than the signal level obtained by the first calculation means at the comparison means; and means that generates a reception antenna direction adjustment signal from a signal obtained by switching between the signal level obtained by the first calculation means and the signal level obtained by the second calculation means on the basis of a result of the comparison unit, and performs direction adjustment of a reception antenna by using the generated direction adjustment signal.

Furthermore, in the above description, the first calculation means is first calculation means that performs complex multiplication of the received OFDM signal by each of a signal obtained by delaying the OFDM signal by effective symbol period length, a signal obtained by delaying it by effective symbol period length−one sample, and a signal obtained by delaying it by effective symbol period length+one sample, sums results of the complex multiplication, performs averaging processing for a signal obtained as a result of the sum, performs absolute value calculation processing for a complex multiplication signal obtained by the averaging processing, and thereby calculates a signal level; and the second calculation means is second calculation means that performs complex multiplication of the received OFDM signal by each of a signal obtained by delaying the OFDM signal by one symbol period length (the effective symbol+the guard interval), a signal obtained by delaying it by one symbol period length−one sample, and a signal obtained by delaying it by one symbol period length+one sample, sums results of the complex multiplication, performs averaging processing for a signal obtained as a result of the sum, performs absolute value calculation processing for a complex multiplication signal obtained by the averaging processing, and thereby calculates a signal level.

Advantageous Effects of Invention

In an antenna direction adjustment method when receiving an OFDM signal for which there was used any scheme of a scheme including a pilot carrier like the QAM scheme and a scheme only including a data carrier like the differential scheme, when the OFDM reception device according to the present invention is used, determining whether correlation at one symbol time difference of the reception signal is higher or correlativity at effective symbol difference is higher enables discrimination of whether the scheme is the QAM scheme or the differential scheme, and automatic application of an optimal direction adjustment signal level.

BRIEF DESCRIPTION OF DRAWINGS

FIG. 9 is a pattern diagram showing signals at various parts in the reception electric field calculation unit 4.

DESCRIPTION OF EMBODIMENTS

In the above-mentioned conventional antenna direction adjustment method in the OFDM scheme, there was a problem in which reception electric field signals R detected at the same CN ratio (reception electric field level) indicate different values in the case of receiving the signals of a modulation scheme including a pilot carrier called a CP carrier (hereinafter, a QAM scheme) and a modulation scheme not including a pilot carrier (hereinafter, a differential scheme).

Figure 11:
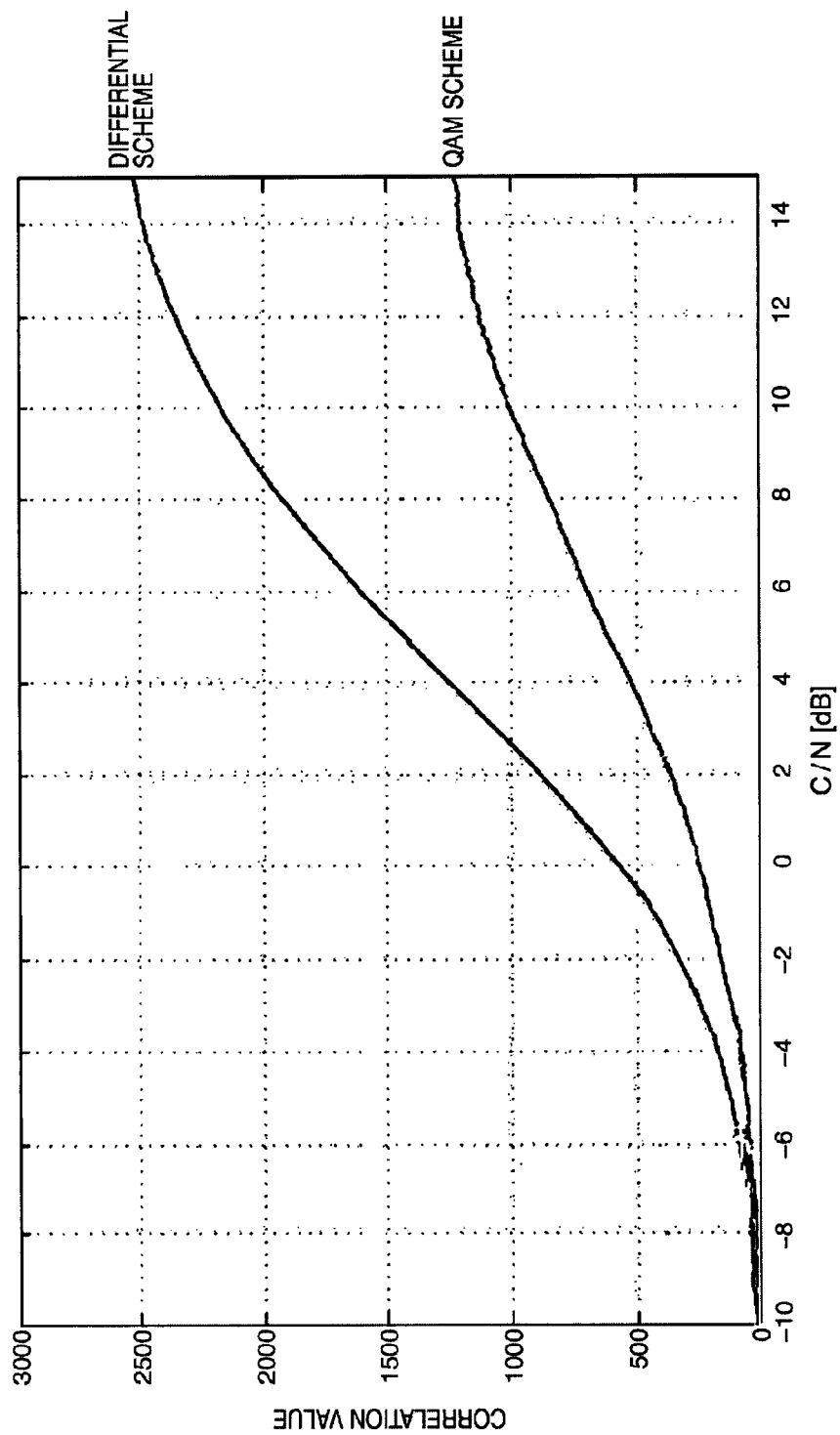
FIG. 11 is a diagram showing characteristic difference between reception electric field signals R of a QAM scheme and a differential scheme.

FIG. 11 is a diagram comparing characteristics of the reception electric field signals R of the QAM scheme and the differential scheme in the conventional antenna direction adjustment method, and as can be seen, at each CN ratio, relative comparison of the differential scheme to the QAM indicates about twice value.

Figure 12:
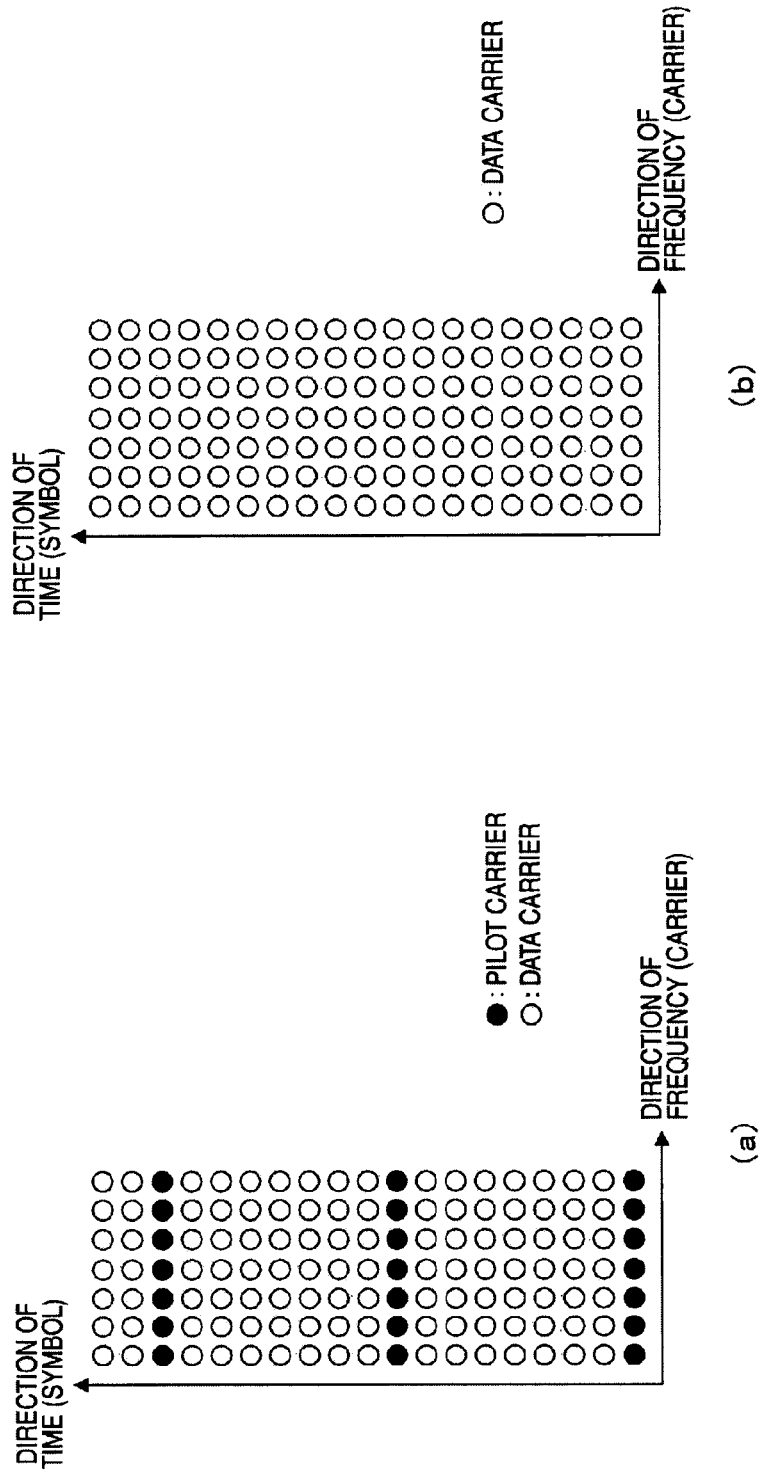
FIG. 12 is a diagram showing carrier arrangement images of the QAM scheme and the differential scheme.

FIG. 12(a) is an example of carrier arrangement at a time of the QAM scheme. A horizontal axis shows the direction of a frequency (carrier) and a vertical axis shows the direction of time (symbol). As shown, the carrier arrangement at the time of the QAM scheme is made by mainly arranging data carriers and pilot carriers, the pilot carriers are arranged in a distributed manner in the frequency direction (in the example, an equal interval of every eight carriers) and arranged consecutively in the time direction. The number of all the carriers is large, for example, about 800, and the number of the pilot carriers is, for example, an eighth part of the number of all the carriers. In addition, for example, as other carriers, about 10 control carriers called TMCC (Transmission and Multiplexing Configuration and Control) carriers are arranged, but they are omitted from the figure. Other carriers may be arranged but in order to simplify explanation, they are omitted in the example. In addition, for example, when the average power of a data carrier is 1 (=12), the power of a pilot carrier is $(4/3)^2$, and the power of a control carrier is $(4/3)^2$.

On the other hand, FIG. 12(b) shows one example of carrier arrangement at a time of the differential scheme, and all carriers are data carriers. Also in this case, for example, as other carriers, about 10 control carriers called TMCC carriers are arranged, but they are omitted from the figure. In addition, other carriers may be arranged but in order to simplify explanation, they are omitted in the example.

On the basis of the above-described knowledge, the reason why the detected reception electric field signals R are different at the same C/N value (reception electric field level) in the QAM scheme and the differential scheme will be explained below in detail.

Suppose that a reception signal in the QAM scheme including pilot carriers is x(t), a data carrier component is $x_{DATA}(t)$, and a pilot carrier component is $x_{CP}(t)$, then $$x(t) = x_{DATA}(t) + x_{CP}(t) \qquad 3).$$

A correlation waveform $C(\tau)$ between the reception signal (3) and a signal obtained by delaying it by $\tau$ samples is as follows:

[MATH. 1]

$$C(\tau) = \sum_t x(t) \cdot x^*(t - \tau) \quad (4)$$

Because the data carriers and the pilot carriers are uncorrelated, the correlation waveform $C(\tau)$ is superposition of correlation of the data carriers and correlation of the pilot carriers.

[MATH. 2]

$$C(\tau) = C_{DATA}(\tau) + C_{CP}(\tau) \quad (5)$$
$$= \sum_t x_{DATA}(t) \cdot x^*_{DATA}(t-\tau) - \sum_t x_{CP}(t) \cdot x^*_{CP}(t-\tau)$$

Figure 13:
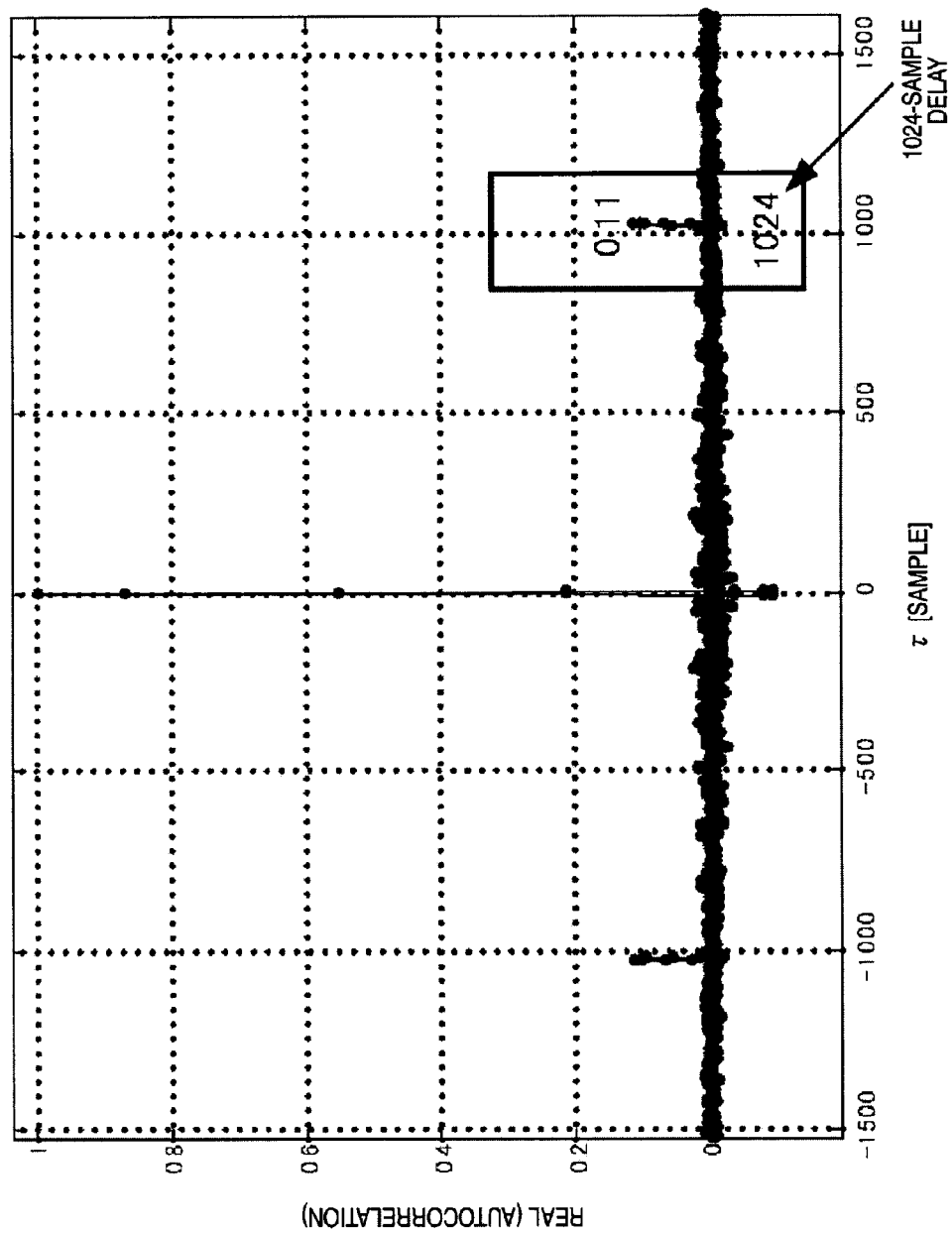
FIG. 13 is a real number component diagram of correlation values of a data carrier.

FIG. 13 shows the real number component of a correlation value of the data carriers, and its imaginary component is nearly zero. About data carrier correlation, only when delay time $\tau$ is effective symbol length (for example, 1024 samples here), they are correlated, and when the delay time T is one symbol length (for example, suppose here that guard interval length is 128 samples, then it is 1152 samples (=1024+128)), they are uncorrelated.

Figure 14:
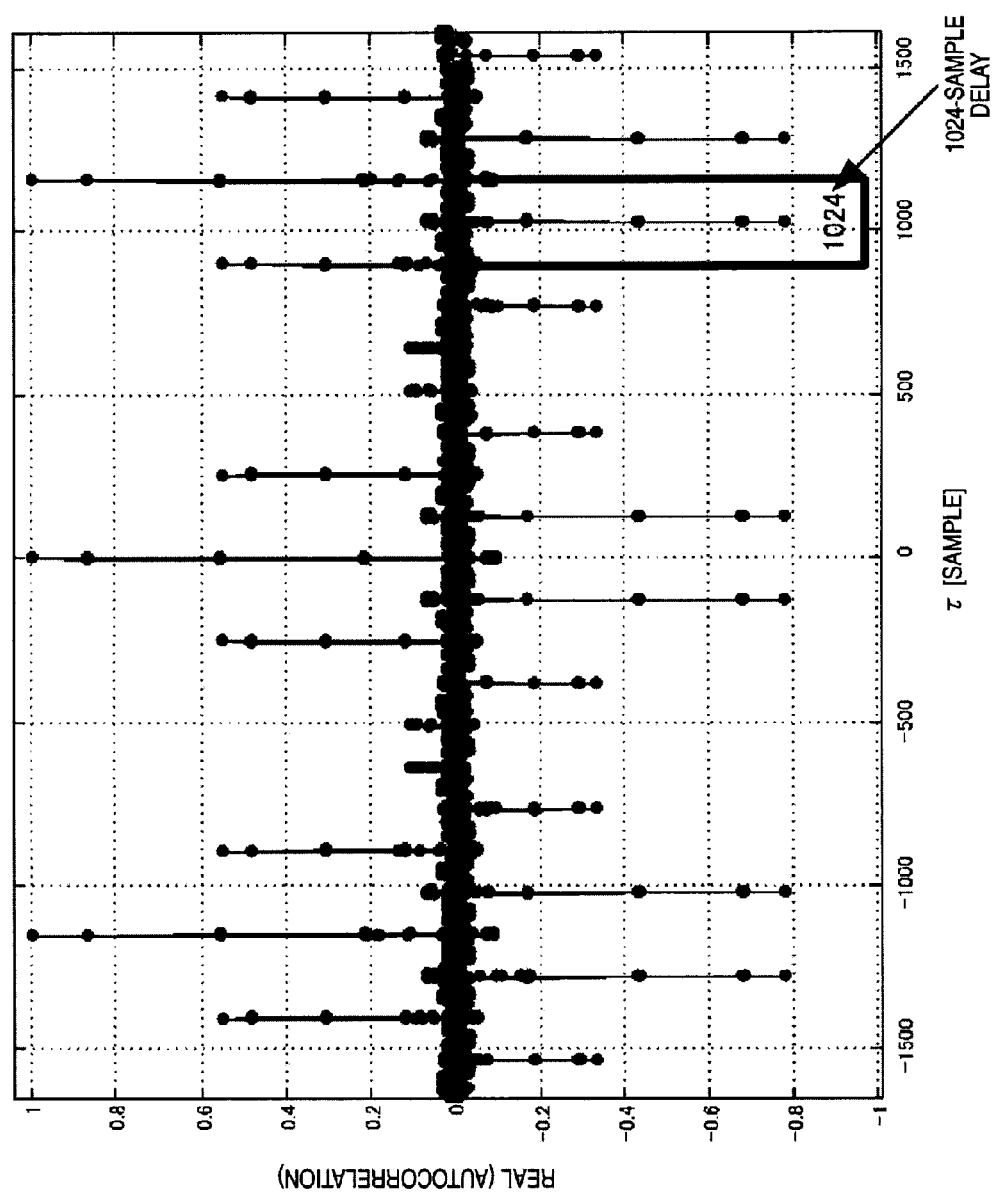
FIG. 14 is a real number component diagram of correlation values of a pilot carrier.

On the other hand, FIG. 14 shows the real number component of an autocorrelation value of the pilot carriers. As is the case with the data carriers, its imaginary component is nearly zero. A correlation value of the pilot carriers is different from the correlation value of the data carriers shown in FIG. 13, and also indicates correlativity at delay time other than $\tau$=1024. In addition, regarding $\tau$=1024 delay time, as can be seen, the real number component of correlation of the pilot carriers is negative.

The reason why the real number component becomes negative will be further explained below in detail.

As described above, the pilot carriers are arranged with an eight-carrier interval (4(2k+1)), its pilot carrier component is shown in a formula (6). In addition, although the pilot carriers are modulated randomly with a code $W_t$, which is not considered here because it may be omitted as well.

[MATH. 3]

$$x_{CP}(t) = \sum_{k=-54}^{53} e^{j\frac{2\pi}{1024}4(2k+1)t} \quad (6)$$

Therefore, the correlation of the pilot carriers at $\tau$=1024 is as follows.

[MATH. 4]

$$C_{CP}(1024) = \sum_{t=0}^{1023} x(t) \cdot x^*(t - 1024) \quad (7)$$
$$= \sum_{t=0}^{1023} \left[ \sum_{k=-54}^{53} e^{j\frac{2\pi}{1024}4(2k+1)t} \cdot \sum_{l=-54}^{53} e^{-j\frac{2\pi}{1024}4(2l+1)(t+128)} \right]$$
$$= \sum_{t=0}^{1023} \left[ \sum_{k=-54}^{53} e^{j\frac{2\pi}{256}(2k+1)t} \cdot \sum_{l=-54}^{53} e^{-j\{\frac{2\pi}{256}(2l+1)t+2\pi l+\pi\}} \right]$$

Here, consider correlation $C_{CP,(k,l)}(1024)$ only taking a "k" carrier and an "l" carrier into consideration.

[MATH. 5]

$$C_{CP,(k,l)}(1024) = \sum_{t=0}^{1023} \left[ e^{j\frac{2\pi}{256}(2k+1)t} \cdot e^{-j\{\frac{2\pi}{256}(2l+1)t+2\pi l+\pi\}} \right] \quad (8)$$
$$= \sum_{t=0}^{1023} \left[ e^{j\{\frac{2\pi}{256}2(k-l)t-2\pi l-\pi\}} \right]$$

In the formula (8), correlation is separately considered regarding two cases: k=l and k≠l. First, in the case of k=l, the correlation is as follows in all carriers:

[MATH. 6]

$$C_{CP,(k=l)}(1024) = \sum_{t=0}^{1023} [e^{-j(2\pi l+\pi)}] = -1024 \quad (9)$$

On the other hand, in the case of k≠l, because the carrier components are orthogonal to each other, their correlation component is zero.

[MATH. 7]

$$C_{CP,(k\neq l)}(1024) = \sum_{t=0}^{1023} \left[ e^{j\frac{2\pi}{256}\{2(k-l)t-\pi\}} \right] = 0 \quad (10)$$

Therefore, the correlation shown in the formula (7) is as follows.

$$C_{CP,(k,l)}(1024) = C_{CP,(k=l)}(1024) + C_{CP,(k\neq l)}(1024) = 1024 \quad (11)$$

The pilot carrier correlation value at $\tau$=1024 indicates a negative result.

Figure 15:
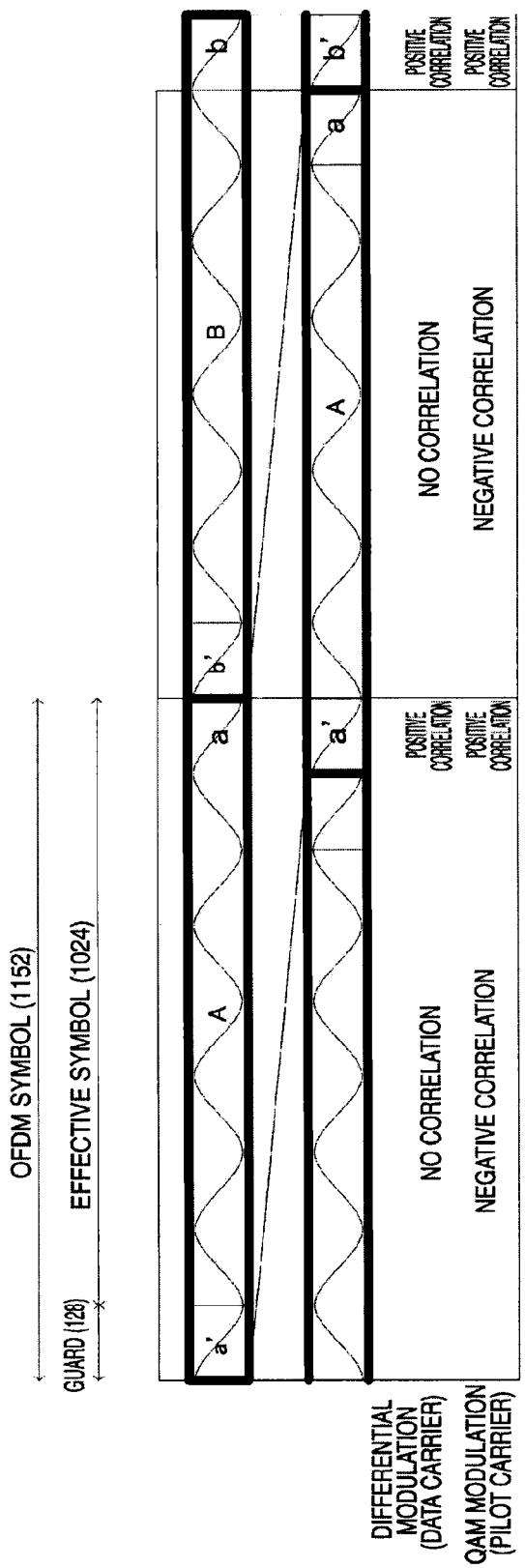
FIG. 15 is a pattern diagram showing correlativity at a time of τ=1024.

FIG. 15 shows, as an example, pilot carriers at a certain particular carrier position at the time of $\tau$=1024 by sine waves, the same can be said for pilot carriers at positions other than this. Because they are in-phase in the guard interval period, the real component of the pilot carrier correlation is positive, and about the data carriers also, because they are the same signal, a positive correlation value is obtained. Conversely, about the period other than the guard interval, as shown in FIG. 15, the correlation object pilot carriers have a relation of a reversed phase, and the real number component of the pilot carrier correlation value becomes negative. From this, the correlation value on the whole is that the positive correlation of the pilot carriers and the positive correlation of the data carriers in the guard interval period are offset by the negative correlation of the pilot carriers other than the guard interval period. Because the negative correlation level of the pilot carriers spans the whole symbol and as described before, the power of a pilot carrier is larger than that of a data carrier, an offset result of the above-mentioned correlation value becomes negative. Therefore, in the QAM scheme including the pilot carriers which have negative correlation at $\tau$=1024, the reception electric field signal R is a smaller value than that in the differential scheme only including the data carriers.

Because of the above-mentioned reason, when antenna direction adjustment is performed at an FPU reception side of the OFDM modulation scheme having both QAM scheme and differential scheme in the prior art, the reception side also needs to manually switch between the QAM scheme and the differential scheme to perform direction adjustment when a transmission side switches between the QAM scheme and the differential scheme.

However, in the case of assuming a system that performs communication by adaptively switching between the QAM scheme and the differential scheme at the transmission side such as the system that switches between the QAM scheme and the differential scheme according to an operation condition, it is desirable that the reception side automatically switches between the QAM scheme and the differential scheme.

The present invention is made in light of such a situation, and its objective is to provide a reception device that can discriminate which is a scheme used for a signal received from a transmission side, the QAM scheme or the differential scheme, calculate a reception electric field signal adapted to each scheme, and perform antenna direction adjustment on the basis of the result.

Figure 10:
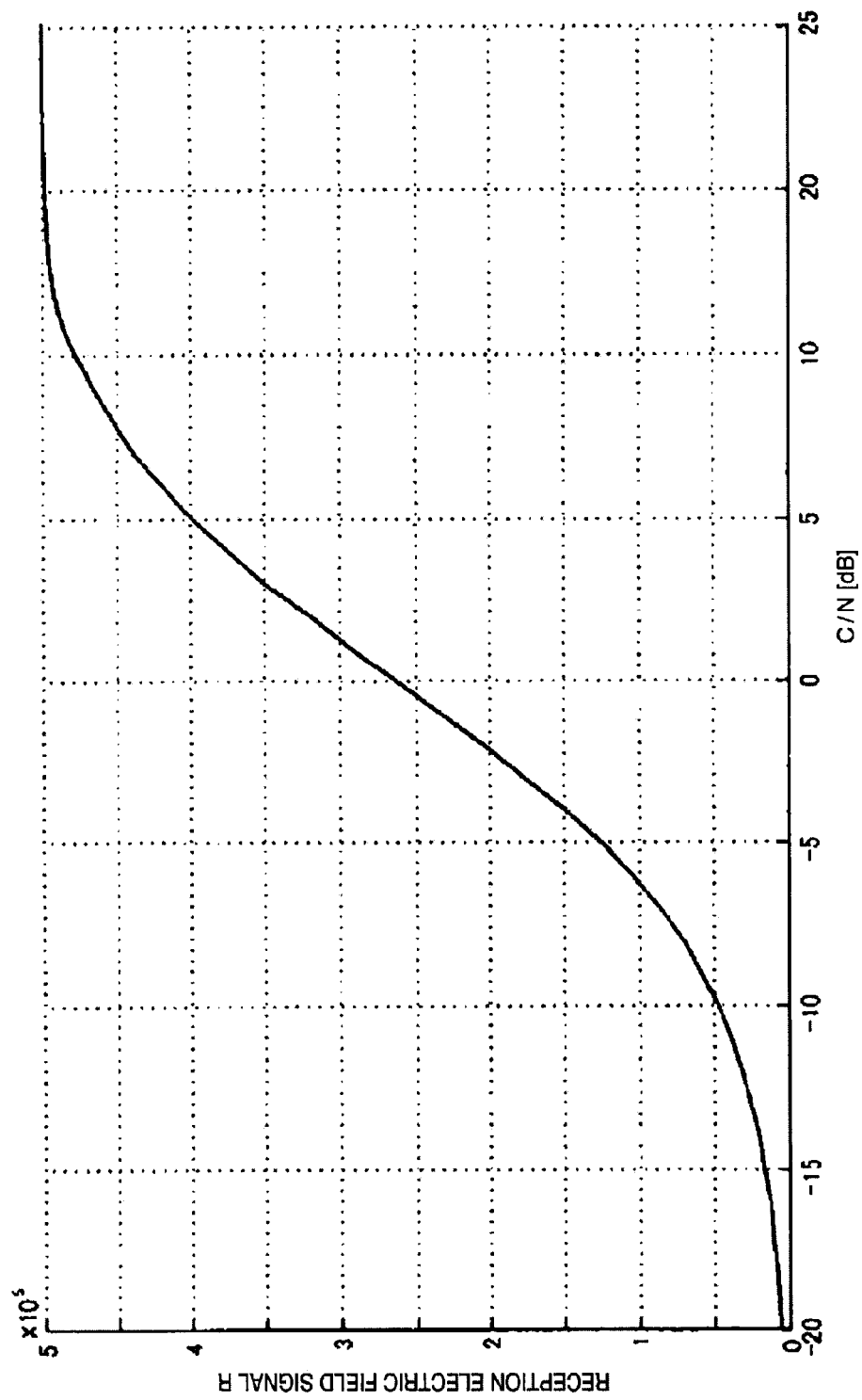
FIG. 10 is a diagram showing a characteristic of the reception electric field signal R relative to the CN ratio in the prior art.
Figure 16:
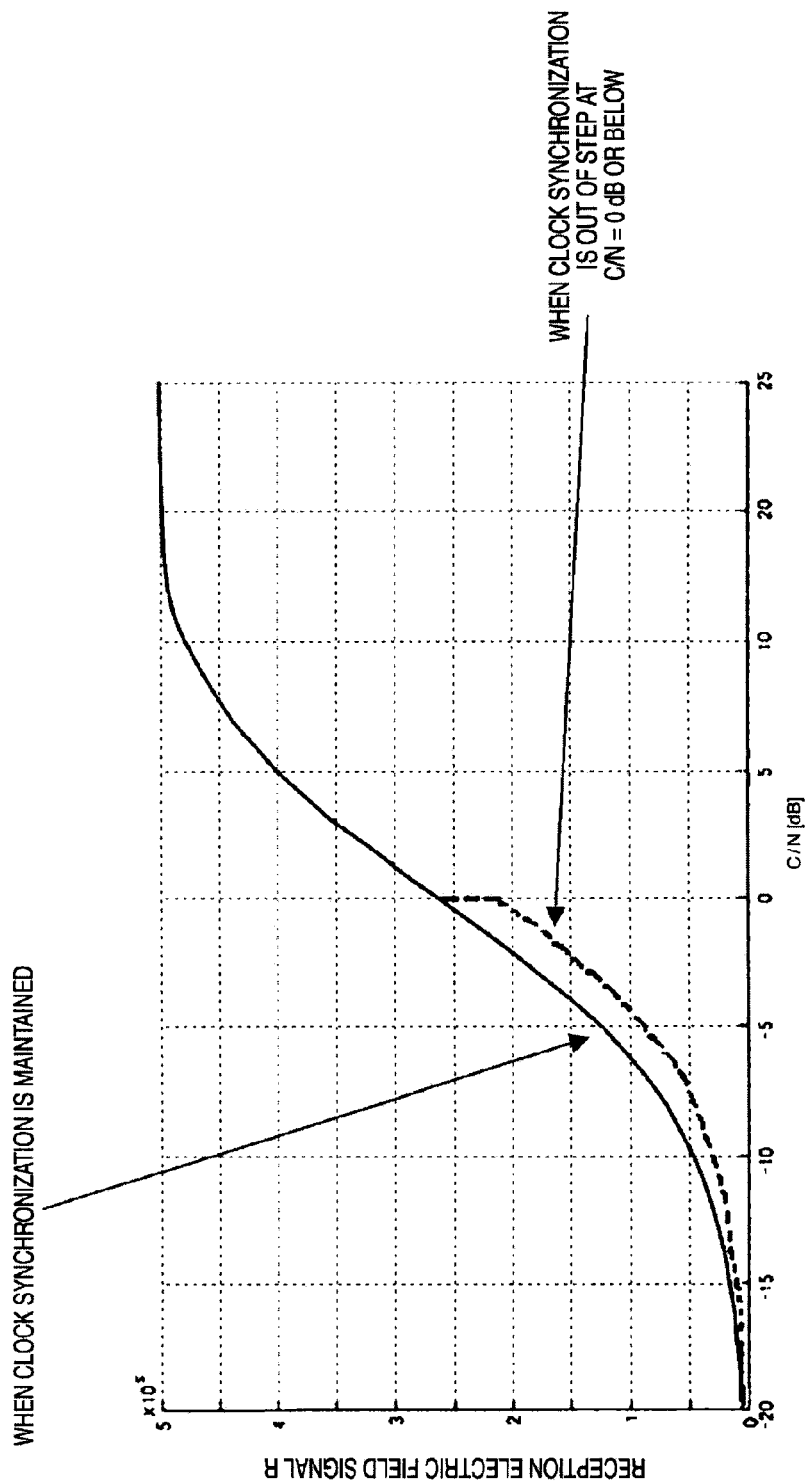
FIG. 16 is a diagram showing a characteristic of the reception electric field signal R relative to the CN ratio when clock synchronization is out of step.

FIG. 16 shows a characteristic example of showing, by a dashed line, the case where actual clock timing (symbol) synchronization with the transmission side is out of step at the reception side for the characteristic of the reception electric field signal R at each C/N shown in above-described FIG. 10. Also depending on the characteristic of a PLL circuit (VCXO frequency variable range) to establish clock timing synchronization, because clock timing synchronization of OFDM is out of step in the vicinity of the C/N ratio of about 0 dB, in that case, a point indicating the maximum value of the correlation result deviates by about ±1 sample. Therefore, as shown by the dashed line in FIG. 16, a detection value becomes smaller as soon as clock timing synchronization is out of step, and thereby its continuity is lost. Because the antenna direction adjustment at the reception side searches for the maximum detection level by changing the antenna direction from an unreceived state (CN ratio of 0 dB or below), there also was a problem of not being able to perform direction adjustment well due to hunting occurring during a process of antenna direction adjustment in the case where there is a drastic change in continuity of the detection level as described above.

The present invention is made in light of such a conventional situation, and its objective is to provide a reception device that can maintain the continuity of a detection level and perform stable antenna direction adjustment under the condition that clock timing synchronization is out of step.
Embodiment 1

Figure 1:
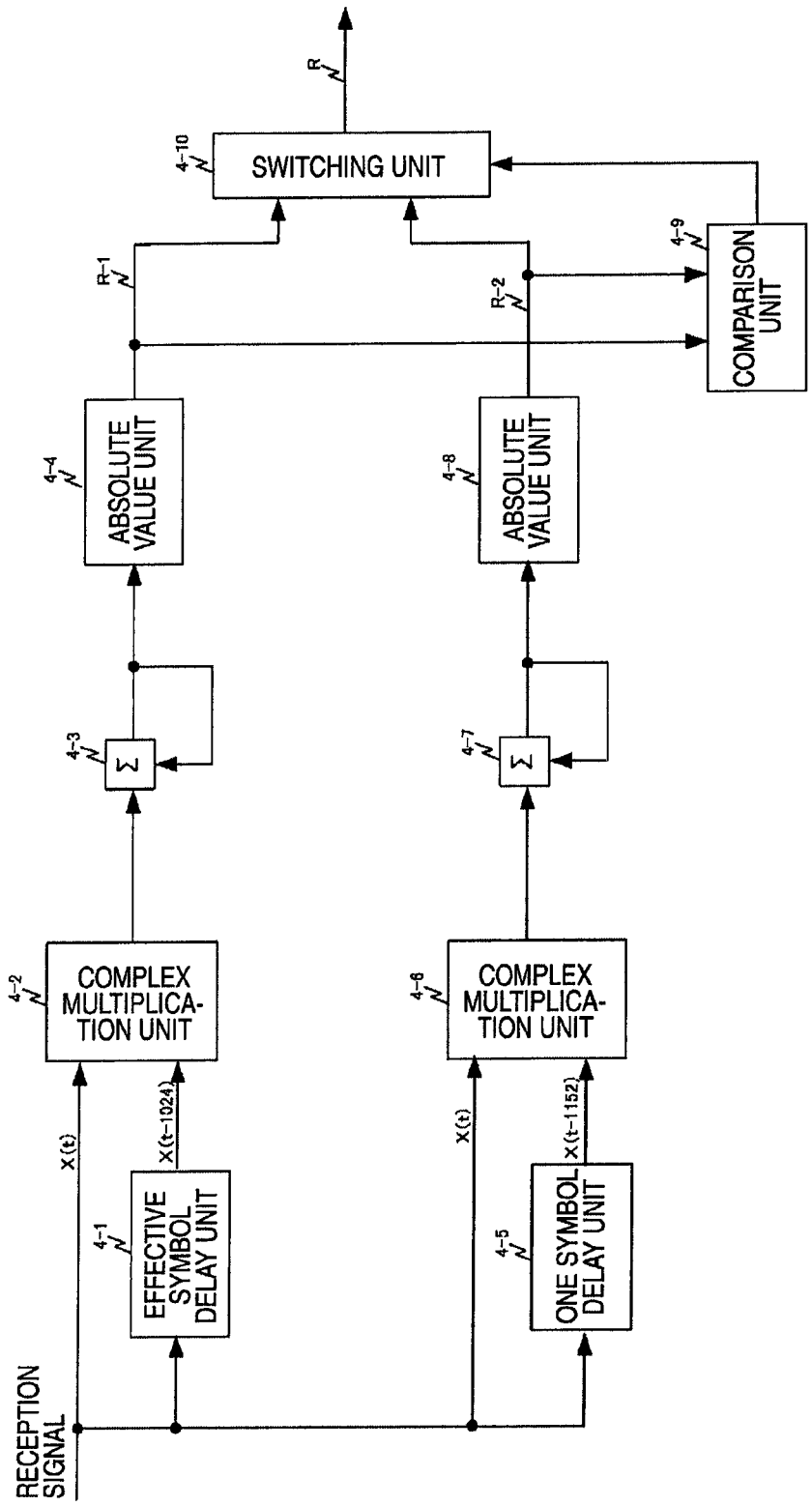
FIG. 1 is a block diagram showing one embodiment of a reception electric field calculation unit 4 in the present invention.
Figure 7:
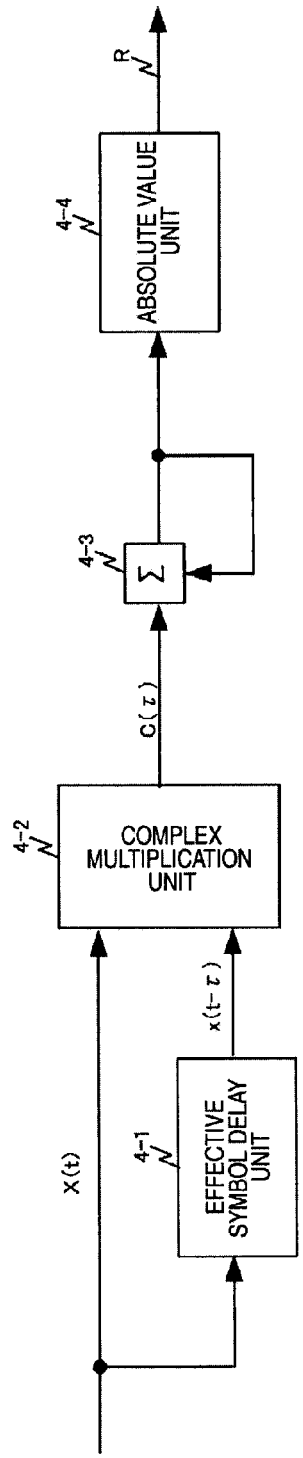
FIG. 7 is a block diagram showing one embodiment of the reception electric field calculation unit 4 in the prior art.
Figure 8:
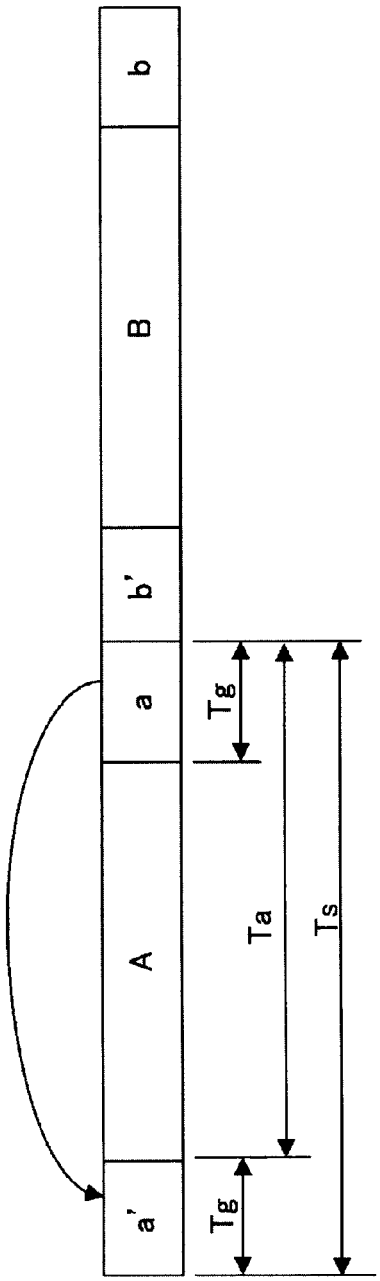
FIG. 8 is a pattern diagram showing an OFDM symbol configuration.

Embodiments according to the present invention will be explained below by the embodiments shown in drawings in detail. FIG. 1 is a diagram showing a first embodiment of the present invention. In the block diagram showing the reception antenna direction adjustment method shown in above-described FIG. 7, the reception electric field calculation unit 4 is made to have a configuration in the present invention.

A reception sample sequence x(t) from the above-described A/D conversion circuit 3 is connected with an effective symbol delay unit 4-1, output of a reception sample sequence x(t−1024) delayed by an effective symbol (for example, τ=1024) is connected with a complex multiplication unit 4-2. Another input terminal of the complex multiplication unit 4-2 is connected with a reception signal from the A/D conversion circuit 3. An output signal from the complex multiplication unit 4-2 is integrated for a prescribed period after connected with an integration unit 4-3, and is output as a reception electric field signal R-1 via an absolute value unit 4-4.

In the same way, the reception sample sequence x(t) from the above-described A/D conversion circuit 3 is connected with a one symbol delay unit 4-5, output of a reception sample sequence x(t−1152) delayed by one symbol (for example, τ=1152, the effective symbol 1024 +the guard interval 128) is connected with a complex multiplication unit 4-6. Another input terminal of the complex multiplication unit 4-6 is connected with the reception signal from the A/D conversion circuit 3. As described below, an output signal from the complex multiplication unit 4-6 is integrated for a prescribed period after connected with an integration unit 4-7, and is output as a reception electric field signal R-2 via an absolute value unit 4-8.

A circuit that calculates the reception electric field signal R-1 from a result of correlation between the above-mentioned reception signal and a signal obtained by delaying it by the effective symbol (for example, 1024 samples) is the same as the configuration in the prior art, but there is newly added a circuit that figures out the reception electric field signal R-2 from a result of correlation between the reception signal and a signal obtained by delaying it by one symbol (for example, 1152 samples). The reason will be explained below.

As mentioned above, about the result of correlation between the reception signal and the signal delayed by the effective symbol, calculation results are different at the same CN ratio for the QAM scheme including a pilot carrier and the differential scheme only including a data carrier; therefore, attention is newly paid to correlativity of the QAM scheme signal including a pilot carrier in the case of being delayed by one symbol (τ=1152).

Figure 2:
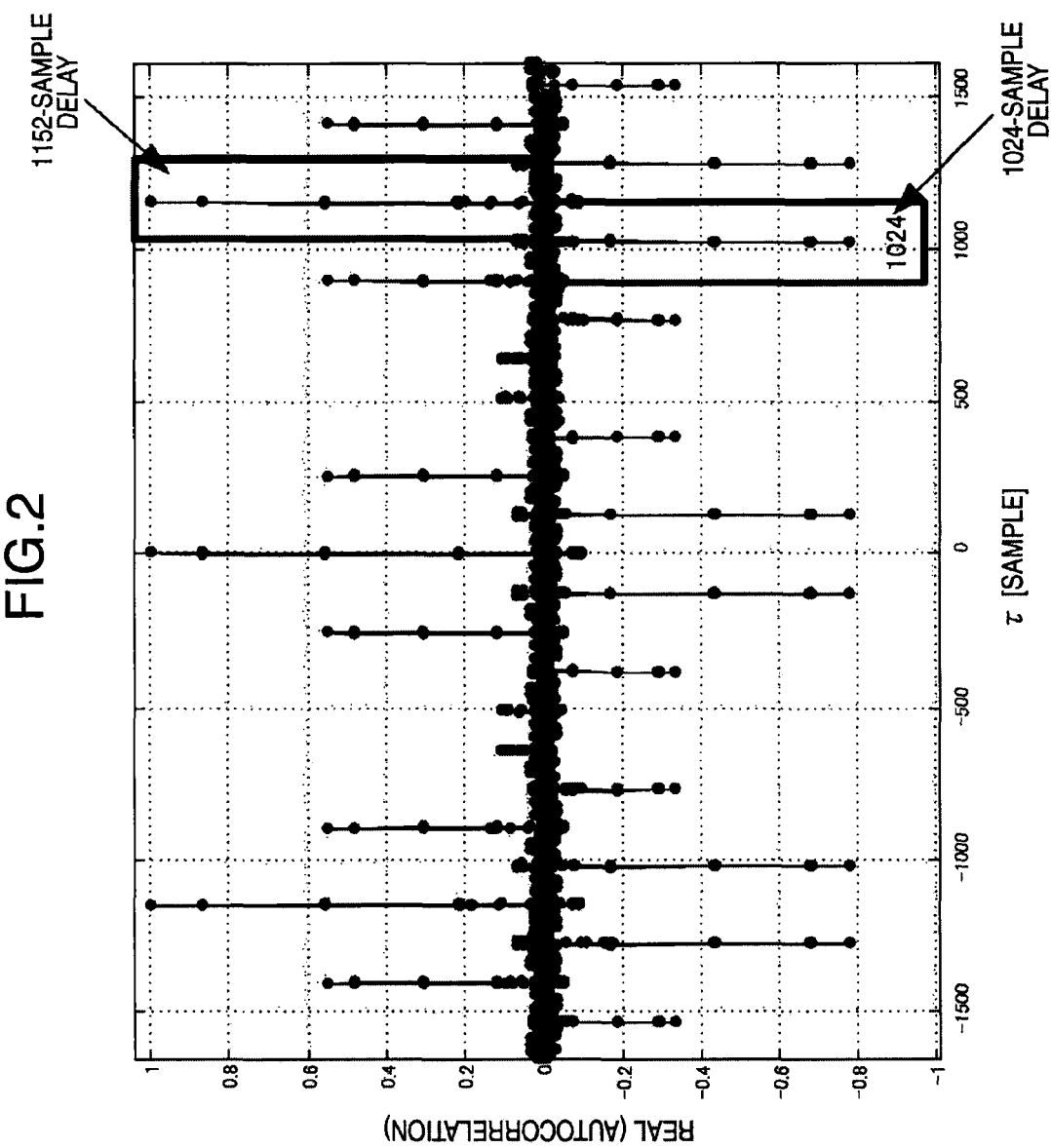
FIG. 2 is a real number component diagram of correlation values of a pilot carrier.

FIG. 2 has paid attention to a correlation component at the time of τ=1152 for the real number component of the autocorrelation value of only the pilot carriers shown in above-described FIG. 14. As described above, the correlation value of the pilot carriers indicates negative correlation at τ=1024, but because the pilot carriers are the same signal per symbol, the signals are perfectly accord per τ=1152 (OFDM symbol length), and it can be seen that the correlation value of only the pilot carriers becomes the largest correlation value. However, data carrier correlation at this delay time is no correlation as shown in FIG. 13.

Figure 3:
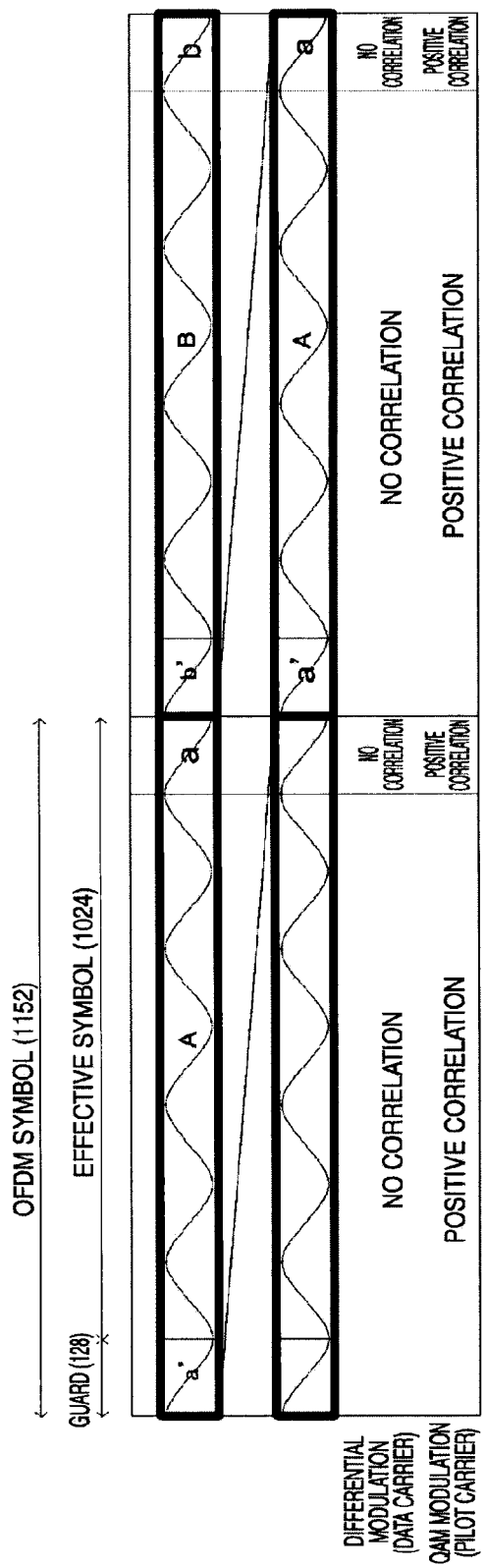
FIG. 3 is a pattern diagram showing correlativity at a time of τ=1152.

An explanation will be given further in FIG. 3. FIG. 3 shows, as an example, a pilot carrier at a certain particular carrier position, by a sine wave, at the time of τ=1152 (OFDM symbol length), but the same can be said for pilot carriers at positions other than this. About the pilot carriers, because they are in-phase in the guard interval period and the period other than the guard interval period, the real number component of the pilot carrier correlation becomes positive. On the other hand, about the data carriers, they are uncorrelated in the guard interval period and the period other than the guard interval period.

Figure 4:
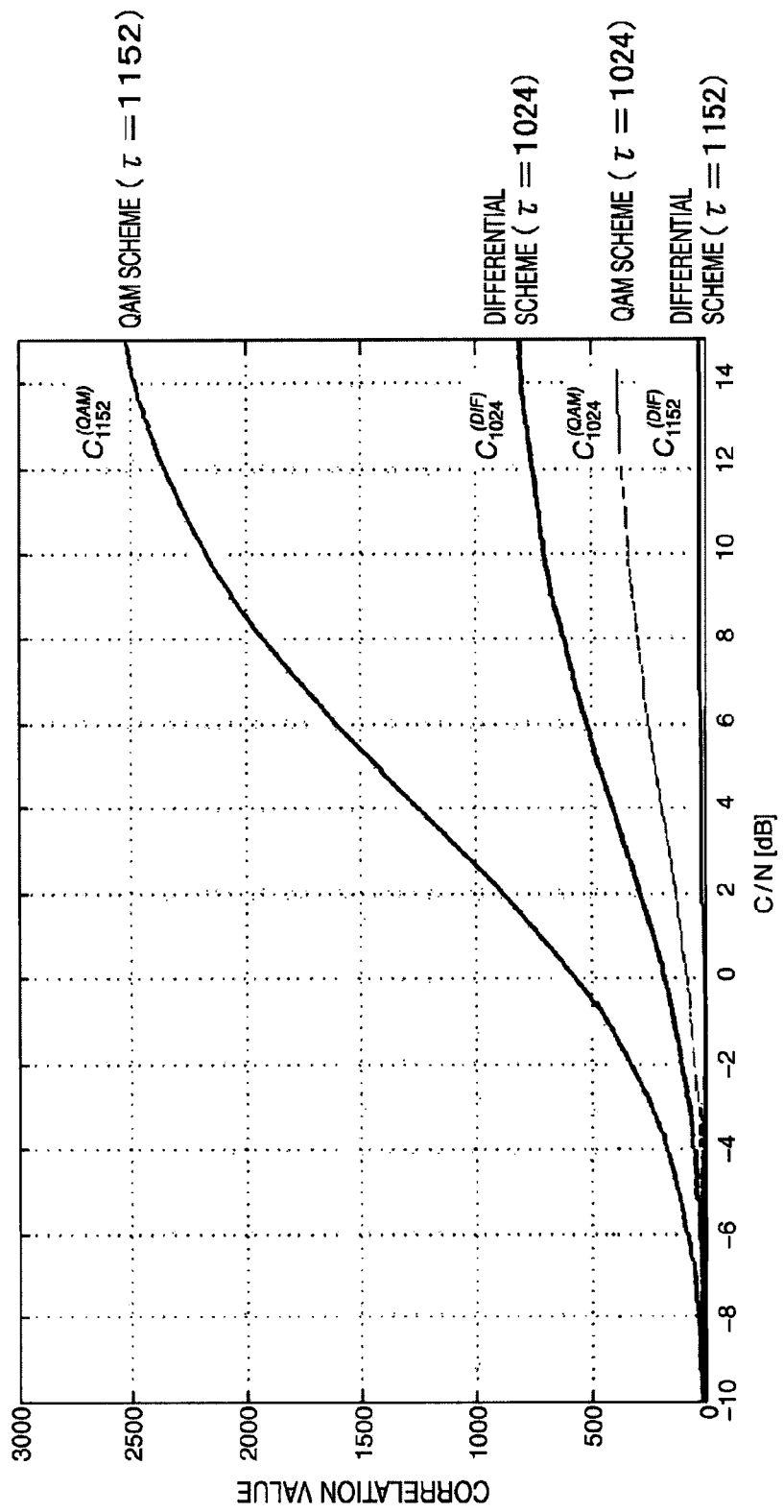
FIG. 4 is a diagram showing a characteristic of a reception electric field signal R relative to a CN ratio in the present invention.

FIG. 4 is a diagram showing a result of correlation between the reception signal and a signal delayed by the effective symbol (τ=1024) and a result of correlation between the reception signal and a signal delayed by the one symbol (τ=1152) in the reception electric field calculation unit 4 according to the present invention for each of the QAM scheme including a pilot carrier and the differential scheme only including a data carrier.

In the case of receiving a signal of the differential scheme, as mentioned above, the correlation value $C_{DIF}(1152)$ at τ=1152 is nearly zero, but $C_{DIF}(1024)$ has high correlativity;

therefore, they have the relation of $|C_{DIF}(1152)|<|C_{DIF}(1024)|$. Conversely, in the case of the QAM scheme, because high correlativity of the pilot carriers is obtained, they have the relation of $|C_{DIF}(1152)|>|C_{DIF}(1024)|$. Thus, the relation of magnitude of C(1024) and C(1152) is reversed between the differential scheme and the QAM scheme at any CN ratio. Therefore, the magnitude relation between these correlation values allows a received modulation scheme to be discriminated.

The reception electric field signal R-1(|C(1024)|) and the reception electric field signal R-2(|C(1152)|) are compared in terms of magnitude by a comparison unit 4-9, and a switching unit 4-10 performs switching control. The switching unit 4-10 performs the following switching control:

Case A: If the reception electric field signal R-1> the reception electric field signal R-2, to recognize that the differential scheme was received, and to output the reception electric field signal R-1(|C(1024)|); and Case B: If the reception electric field signal R-1<the reception electric field signal R-2, to recognize that the QAM scheme was received, and to output the reception electric field signal R-2(|C(1152)|).

The signal from the switching unit 4-10 is connected with the direction adjustment signal generation unit 5, which enables generation of a direction adjustment signal C of the reception antenna 1 from the relation of each CN ratio relative to the reception electric field signal R shown in FIG. 4.

As described above, the reception electric field calculation unit 4 of the reception device according to the present invention figures out a correlation level between the received OFDM signal and a signal obtained by delaying the OFDM signal by effective symbol period length, further figures out a correlation level between the received OFDM signal and a signal obtained by delaying the OFDM signal by one symbol period length, compares their magnitude relation, and thereby can discriminate the QAM scheme including a pilot carrier and the differential scheme only including a data carrier, that is, at a reception side, can automatically discriminate a modulation scheme used at a transmission side, and can generate a reception antenna direction adjustment signal appropriate to the discriminated modulation scheme.

In addition, it is also become possible to construct a system capable of easily performing reception antenna direction adjustment by using a detected reception level signal.

Embodiment 2

Figure 5:
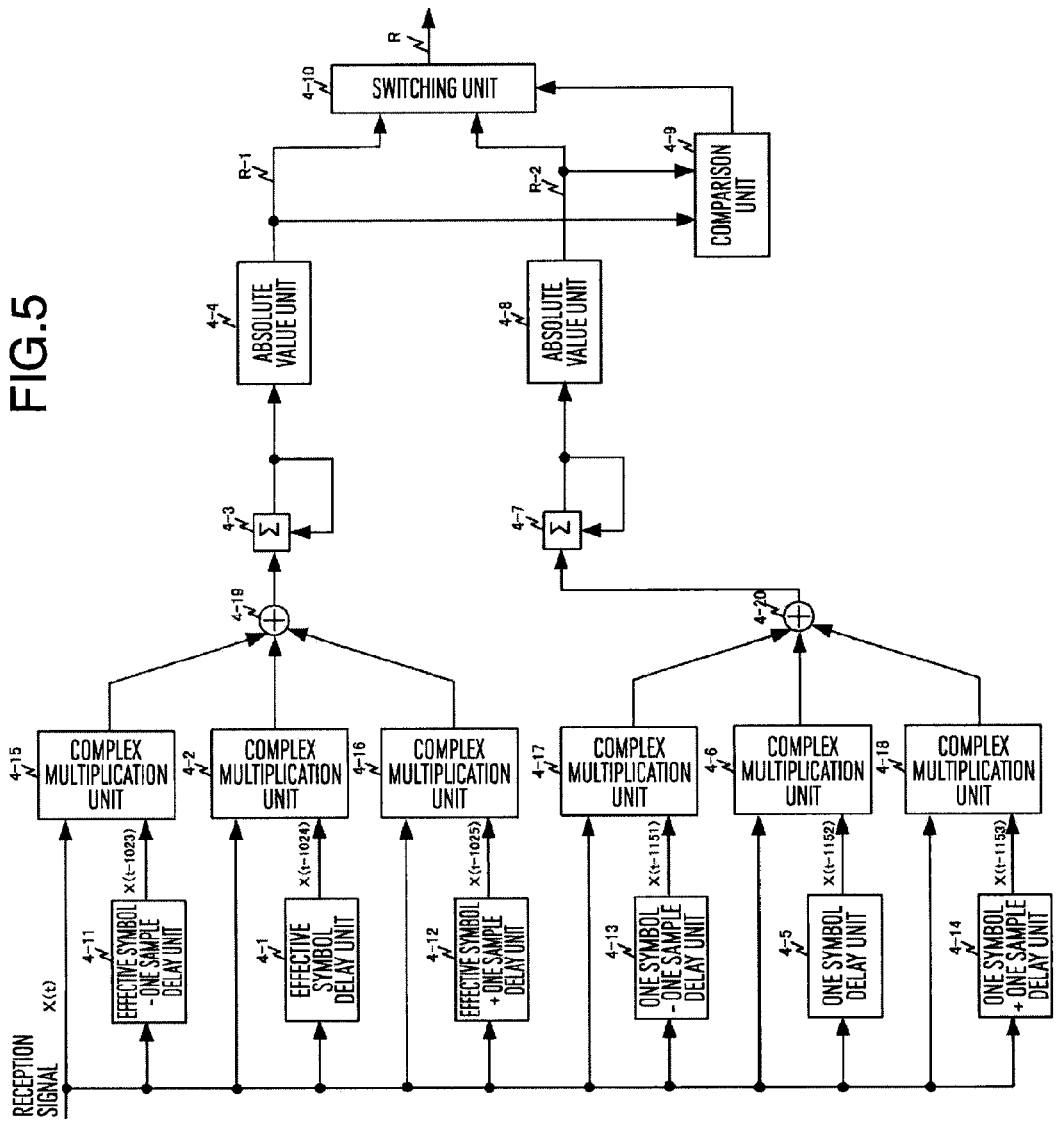
FIG. 5 is a block diagram showing one embodiment of the reception electric field calculation unit 4 in the present invention.
Figure 6:
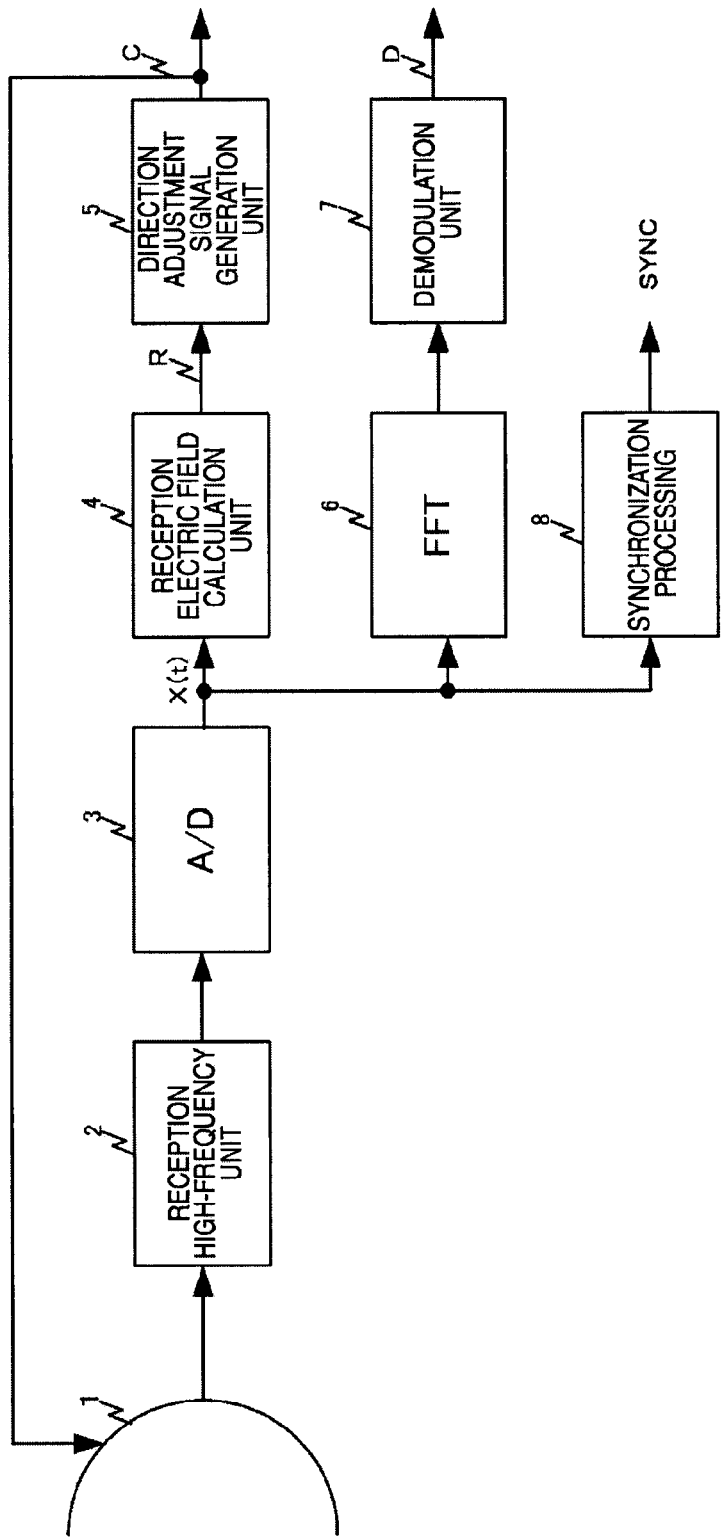
FIG. 6 is a block diagram showing one embodiment of reception antenna direction adjustment in the prior art.

FIG. 5 is a diagram showing a second embodiment of the present invention. The second embodiment has a configuration obtained by further improving the reception electric field calculation unit 4 of the present invention in above-described FIG. 1.

A reception sample sequence x(t) from the above-described A/D conversion circuit 3 is connected with an effective symbol delay unit 4-1, output of a reception sample sequence x(t−1024) delayed by the effective symbol (for example, τ=1024) is connected with a complex multiplication unit 4-2. Another input terminal of the complex multiplication unit 4-2 is connected with a reception signal from the A/D conversion circuit 3. The reception sample sequence x(t) is further connected with an effective symbol−one sample delay unit 4-11, output of a reception sample sequence x(t−1023) delayed by the effective symbol−one sample (for example, τ=1023) is connected with a complex multiplication unit 4-15. Another input terminal of the complex multiplication unit 4-15 is connected with the reception signal from the A/D conversion circuit 3. The reception sample sequence x(t) is further connected with an effective symbol+one sample delay unit 4-12, output of a reception sample sequence x(t−1025) delayed by the effective symbol+one sample (for example, τ=1025) is connected with a complex multiplication unit 4-16. Another input terminal of the complex multiplication unit 4-16 is connected with the reception signal from the A/D conversion circuit 3. Output signals from the complex multiplication unit 4-2, the complex multiplication unit 4-15, and the multiplication unit 4-16 are added by an addition unit 4-19, integrated for a prescribed period after connected with an integration unit 4-3, and output as the reception electric field signal R-1 via an absolute value unit 4-4.

In the same way, the reception sample sequence x(t) from the above-described A/D conversion circuit 3 is connected with a one symbol delay unit 4-5, and output of a reception sample sequence x(t−1152) delayed by one symbol (for example, τ=1152, the effective symbol 1024+ the guard interval 128) is connected with a complex multiplication unit 4-6. Another input terminal of the complex multiplication unit 4-6 is connected with the reception signal from the A/D conversion circuit 3. The reception sample sequence x(t) is further connected with a one symbol−one sample delay unit 4-13, and output of a reception sample sequence x(t−1151) delayed by one symbol−one sample (for example, τ=1151) is connected with a complex multiplication unit 4-17. Another input terminal of the complex multiplication unit 4-17 is connected with the reception signal from the A/D conversion circuit 3. The reception sample sequence x(t) is further connected with a one symbol+one delay unit 4-14, and output of a reception sample sequence x(t−1153) delayed by one symbol+one sample (for example, τ=1153) is connected with a complex multiplication unit 4-18. Another input terminal of the complex multiplication unit 4-17 is connected with the reception signal from the A/D conversion circuit 3. Output signals from the complex multiplication unit 4-6, the complex multiplication unit 4-17, and the complex multiplication unit 4-18 are added by an addition unit 4-20, integrated for a prescribed period after connected with an integration unit 4-7, and output as the reception electric field signal R-2 via an absolute value unit 4-8. After this, operation at a comparison unit 4-9 and a switching unit 4-10 is the same as above described FIG. 1.

As described above, the reception electric field calculation unit 4 of the reception device according to the present invention is provided in advance with three correlation circuits with signals delayed by τ=1024, which produces the highest correlativity in the differential scheme, and by τ±1 sample, and is further provided with three correlation circuits with signals delayed by τ=1152, which produces the highest correlativity in the QAM scheme, and by τ±1 sample, and thereby is enabled to absorb deviation of ±1 sample even under the condition that clock timing synchronization is out of step at the CN ratio of 0 dB or below, and enabled to maintain the continuity of the detection level and to perform stable antenna direction adjustment.

That is, it enables low electric field level detection for both QAM modulation and differential modulation.

Furthermore, at a time of automatic reception, identification of QAM modulation/differential modulation has been performed using information on TMCC after FFT, but identification is enabled at an earlier stage, and demodulation pull-in time is shortened.

In other words, in an antenna direction adjustment method when receiving an OFDM signal for which there was used any scheme of a scheme including a pilot carrier like the QAM scheme and a scheme only including a data carrier like the differential scheme, when the OFDM reception device according to the present invention is used, determining whether correlation at one symbol time difference of the reception signal is higher or correlation at effective symbol difference is higher enables discrimination of whether the scheme is the QAM scheme or the differential scheme, and automatic application of an optimal direction adjustment signal level.

In addition, it enables maintaining the continuity of the reception detection level, for example, under the condition that clock timing synchronization is out of step at the C/N ratio of 0 dB or below.

Furthermore, it also enables construction of a system capable of easily performing reception antenna direction adjustment using a reception level signal detected with shortened demodulation pull-in time.

INDUSTRIAL APPLICABILITY

The present invention can be widely applied to, for example, reception antenna direction adjustment in a transmission device such as an FPU using the OFDM scheme, and reception antenna direction adjustment with an easy and time-shortened manner using a reception level signal detected by a reception detection level, especially when a reception electric field is low.

REFERENCE SIGNS LIST

1 Reception antenna
2 Reception high-frequency unit
3 A/D conversion circuit
4 Reception electric field calculation unit
5 Direction adjustment signal generation unit
6 FFT
7 Demodulation unit
8 Synchronization processing unit
4-1 Effective symbol delay unit
4-2 Complex multiplication unit
4-3 Integration unit
4-4 Absolute value unit
4-5 One symbol delay unit
4-6 Complex multiplication unit
4-7 Integration unit
4-8 Absolute value unit
4-9 Comparison unit
4-10 Switching unit
4-11 Effective symbol−one sample delay unit
4-12 Effective symbol+one sample delay unit
4-13 One symbol−one sample delay unit
4-14 One symbol+one sample delay unit
4-15 Complex multiplication unit
4-16 Complex multiplication unit
4-17 Complex multiplication unit
4-18 Complex multiplication unit
4-19 Addition unit
4-20 Addition unit

The invention claimed is:

1. An OFDM reception device for receiving a signal in which any mode of modes of a scheme including a pilot carrier and a data carrier and a scheme including only a data carrier and no pilot carrier is used, the signal being transmitted by an OFDM modulation scheme, the OFDM reception device comprising:
first calculation means that performs complex multiplication of the received OFDM signal by a signal obtained by delaying the OFDM signal by effective symbol period length, performs averaging processing for a signal obtained as a result of the complex multiplication, performs absolute value calculation processing for a complex multiplication signal obtained by the averaging processing, and thereby calculates a signal level;
second calculation means that performs complex multiplication of the received OFDM signal by a signal obtained by delaying the OFDM signal by one symbol period length, performs averaging processing for a signal obtained as a result of the complex multiplication, performs absolute value calculation processing for a complex multiplication signal obtained by the averaging processing, and thereby calculates a signal level;
comparison means that compares the signal level obtained by the first calculation means with the signal level obtained by the second calculation means, determines that the scheme is the scheme including a pilot carrier and a data carrier if the signal level obtained by the second calculation means is higher than the signal level obtained by the first calculation means, and determines that the scheme is the scheme including only a data carrier if the signal level obtained by the second calculation means is lower than the signal level obtained by the first calculation means at the comparison means; and
means that generates a reception antenna direction adjustment signal from a signal obtained by switching between the signal level obtained by the first calculation means and the signal level obtained by the second calculation means on the basis of a result of the comparison means, and performs reception antenna direction adjustment using the generated direction adjustment signal.

2. The reception device according to claim 1, wherein:
the first calculation means is first calculation means that performs complex multiplication of the received OFDM signal by each of a signal obtained by delaying the OFDM signal by effective symbol period length, a signal obtained by delaying the OFDM signal by effective symbol period length−one sample, and a signal obtained by delaying the OFDM signal by effective symbol period length+one sample, sums results of the complex multiplication, performs averaging processing for a signal obtained as a result of the sum, performs absolute value calculation processing for a complex multiplication signal obtained by the averaging processing, and thereby calculates a signal level; and
the second calculation means is second calculation means that performs complex multiplication of the received OFDM signal by each of a signal obtained by delaying the OFDM signal by one symbol period length, a signal obtained by delaying the OFDM signal by one symbol period length−one sample, and a signal obtained by delaying the OFDM signal by one symbol period length+one sample, sums results of the complex multiplication, performs averaging processing for a signal obtained as a result of the sum, performs absolute value calculation processing for a complex multiplication signal obtained by the averaging processing, and thereby calculates a signal level.

3. A direction adjustment method in an OFDM reception device that receives a signal in which any mode of modes of a scheme including a pilot carrier and a data carrier and a scheme including only a data carrier and no pilot carrier is used, the signal being transmitted by an OFDM modulation scheme, the method comprising:

performing first calculation that performs complex multiplication of the received OFDM signal by a signal obtained by delaying the OFDM signal by effective symbol period length, performs averaging processing for a signal obtained as a result of the complex multiplication, performs absolute value calculation processing for a complex multiplication signal obtained by the averaging processing, and thereby calculates a signal level, and performing second calculation that performs complex multiplication of the received OFDM signal by a signal obtained by delaying the OFDM signal by one symbol period length, performs averaging processing for a signal obtained as a result of the complex multiplication, performs absolute value calculation processing for a complex multiplication signal obtained by the averaging processing, and thereby calculates a signal level;

comparing the signal level obtained by the first calculation with the signal level obtained by the second calculation, determining that the scheme is the scheme including a pilot carrier and a data carrier if the signal level obtained by the second calculation is higher than the signal level obtained by the first calculation, and determining that the scheme is the scheme including only a data carrier if the signal level obtained by the second calculation means is lower than the signal level obtained by the first calculation at the comparison; and generating a reception antenna direction adjustment signal from a signal obtained by switching between the signal level obtained by the first calculation and the signal level obtained by the second calculation on the basis of a result of the comparison, and performing reception antenna direction adjustment using the generated direction adjustment signal.

4. The direction adjustment method according to claim 3, wherein:

the first calculation performs first calculation that performs complex multiplication of the received OFDM signal by each of a signal obtained by delaying the OFDM signal by effective symbol period length, a signal obtained by delaying the OFDM signal by effective symbol period length−one sample, and a signal obtained by delaying the OFDM signal by effective symbol period length+one sample, sums results of the complex multiplication, performs averaging processing for a signal obtained as a result of the sum, performs absolute value calculation processing for a complex multiplication signal obtained by the averaging processing, and thereby calculates a signal level; and the second calculation performs second calculation that performs complex multiplication of the received OFDM signal by each of a signal obtained by delaying the OFDM signal by one symbol period length, a signal obtained by delaying the OFDM signal by one symbol period length−one sample, and a signal obtained by delaying the OFDM signal by one symbol period length+one sample, sums results of the complex multiplication, performs averaging processing for a signal obtained as a result of the sum, performs absolute value calculation processing for a complex multiplication signal obtained by the averaging processing, and thereby calculates a signal level.

* * * * *